April 4, 1961 A. A. WASSEL 2,977,849
OPTICAL ELEMENT HOLDER ASSEMBLY
Filed Oct. 23, 1958

INVENTOR.
ALEXANDER A. WASSEL
BY Wade Koontz
Arnold H. Cole
ATTORNEYS

United States Patent Office 2,977,849
Patented Apr. 4, 1961

2,977,849

OPTICAL ELEMENT HOLDER ASSEMBLY

Alexander A. Wassel, Buffalo, N.Y., assignor to the United States of America as represented by the Secretary of the Air Force Filed Oct. 23, 1958, Ser. No. 769,271

5 Claims. (Cl. 88—57)

This invention relates to optical devices and is more particularly concerned with an improved assembly to serve as a holder for optical elements.

The primary object of this invention is to provide a novel holder for mirrors, lenses and the like.

More specifically, it is an object of the invention to provide a holder which is both simple and inexpensive to produce.

Another object of the invention is to provide an optical holder which can be securely mounted on either a plane or a contoured surface.

Still another object of the invention is to provide a holder which permits the use of either face of the optical element contained therein.

Further objects, advantages and features of the present invention will become apparent upon consideration of the following detailed description, especially when taken in conjunction with the accompanying drawings, wherein.

Figure 2:
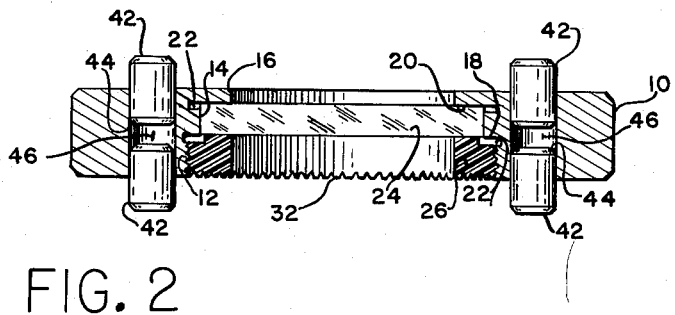
Figure 2 is a horizontal section taken along the line II—II of Figure 1.
Figure 3:
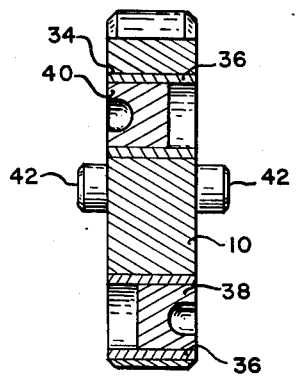
Figure 3 is a vertical section taken along the line III—III of Figure 1.
Figure 4:
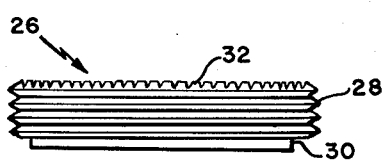
Figure 4 is a detailed elevational showing of the retaining ring for the optical element.

Turning specifically to the drawings wherein like characters of reference designate like parts, a main frame member is shown at 10. Said frame has an outer perimeter of substantially rectangular shape. The edges thereof are chamfered as best seen in Figures 2 and 3. A central opening through the frame 10 takes the form of a plurality of stepped bores 12, 14 and 16. The bore 14 is located between bores 12 and 16. A shoulder 18 is formed between the bores 12 and 14. A second shoulder 20 is formed between the bores 14 and 16. The inside corner of each of said shoulders is relieved as seen at 22 to prevent binding.

An optical element 24 is seated in the bore 14 on the shoulder 20. Said element can be either a lens or a mirror. In order to properly secure the element 24 in place, a plastic retaining ring 26 is provided. The ring is preferably formed of Nylon or similar material having good shock absorbing qualities. Thus the incidence of breakage caused by accidental dropping is decreased. The ring 26 has an external thread 28 thereon which cooperates with an internally threaded section of the bore 12. The face of the ring 26 which seats against the shoulder 18 is cut back as at 30 in order that said ring may be tightened to the maximum. The other face thereof is serrated as at 32. The serrations encircle the entire surface, and their presence permits tightening of the ring 26 without the use of wrenches or other tools.

Figure 1:
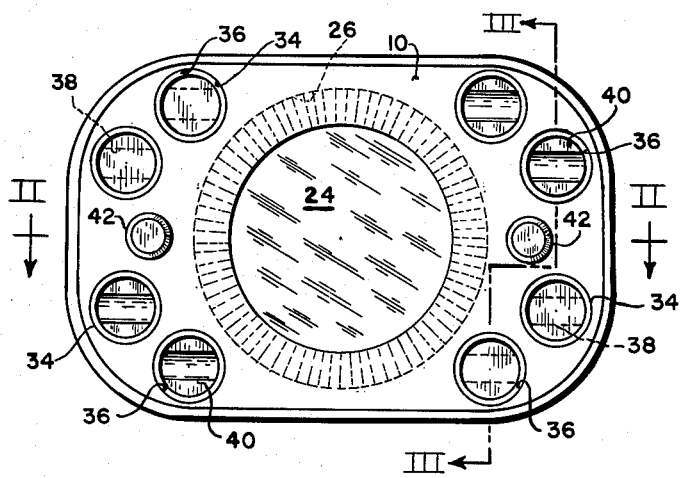
Figure 1 is an elevation showing one face of the assembled optical element and holder.

Turning from the frame member itself to the manner in which the assembly may be mounted, we find a plurality of bores 34 around the periphery of the member 10. Each bore 34 extends completely through said member and has a brass bushing 36 fitted therein. In the particular embodiment shown here, the bores 34 number eight, and these are symmetrically arranged on the sides of said member. It should be noted that such an arrangement is in no way critical, and any other arrangement which fits specific requirements may be employed. Tightly fitted inside of each of the bushings 36 is an Alnico magnet. These magnets are preferably of horseshoe shape, and the overall length of each is less than that of a bushing 36. Of the eight magnets, four are arranged with their pole faces in the plane of one surface of the frame 10. Such magnets are indicated by the reference character 38. The remaining four magnets are indicated at 40 and have their pole faces coplanar with the opposite surface of said frame 10. This is best illustrated in Figure 3. Two magnets 38 are located adjacent each end of one diagonal across the frame 10. The magnets 40 are similarly positioned adjacent the ends of the other diagonal. The arrangement of the magnets in the frame 10 is clearly shown in Figure 1.

A spacer device for the frame 10 takes the form of dowels 42. Said dowels are inserted into bores 44 formed through the frame 10. The number and location of such bores may be determined by the installation in which the frame is to be mounted. A pair of dowels are press fitted into each of said bores. Each dowel extends outwardly from its bore, and the length of said dowels is such that a space 46 ordinarily exists between the inner ends of each pair. The extent to which any particular dowel extends is determined by the contour of the surface on which the frame is to be mounted. Thus, by proper adjustment of the two dowels extending from one face of said frame 10, a solid support is achieved whereby damage and distortion due to vibrations are substantially eliminated.

Among the other advantageous features of the invention is the fact that this novel assembly permits the use of either face of an optical element without removal of said element from its frame. Said assembly also permits the use of elements which were heretofore discarded due to minor chips or irregularities about their peripheries.

It is to be understood that the single embodiment described above is merely illustrative of the principles of the invention. Numerous other embodiments may be devised by those skilled in the art without departing from the spirit and scope of my invention.

What is claimed is:

1. An optical element holder assembly comprising a frame, a plurality of stepped bores through said frame, an optical element seated on a shoulder formed between adjacent bores, an annular retaining ring of shock absorbing plastic threadably engaged with one of said bores for holding said element against said shoulder, and magnetic means having pole faces on opposed surfaces of said frame for mounting said frame on a metallic surface.

2. An assembly as defined in claim 1 including adjustable spacer means associated with both surfaces of said frame.

3. A device of the class described comprising a frame having stepped bores therethrough, an optical element seated upon a shoulder formed between two of said bores, a threaded retaining ring cooperating with a threaded portion in one of said bores to secure said element, said ring being of shock absorbent plastic, and a plurality of permanent magnets fitted into bores around the periphery of said frame for mounting said frame with either side of said optical element adjacent an object to be viewed.

4. A device as defined in claim 3 including a plurality of dowel pins adjustably mounted in said frame for projection therefrom to space said frame from an object to be viewed.

5. A device as defined in claim 3 wherein said ring has a serrated outer edge and a cut back inner edge which secures said optical element.

References Cited in the file of this patent

UNITED STATES PATENTS

| | | |
|---|---|---|
| 803,435 | Saegmuller | Oct. 31, 1905 |
| 886,273 | Tanzey | Apr. 28, 1908 |
| 1,118,193 | Ferber | Nov. 24, 1914 |
| 1,641,880 | Cohen | Sept. 6, 1927 |
| 1,932,143 | Piercy | Oct. 24, 1933 |
| 2,254,498 | Scharf | Sept. 2, 1941 |
| 2,394,894 | Burgert et al. | Feb. 12, 1946 |
| 2,496,099 | Leto | Jan. 31, 1950 |
| 2,521,256 | Salter | Sept. 5, 1950 |
| 2,637,043 | Morrell | May 5, 1953 |
| 2,666,352 | Philips | Jan. 19, 1954 |
| 2,803,953 | Zubalik | Aug. 27, 1957 |
| 2,806,704 | Burdett | Sept. 17, 1957 |
| 2,850,943 | Grineff | Sept. 9, 1958 |

FOREIGN PATENTS

| | | |
|---|---|---|
| 430,826 | Great Britain | June 24, 1935 |
| 821,720 | Germany | Nov. 19, 1951 |
| 915,421 | France | July 22, 1946 |